(12) United States Patent  
Kuroda (10) Patent No.: US 11,213,901 B2
(45) Date of Patent: Jan. 4, 2022

(54) ROTARY TOOL (71) Applicant: KYOCERA Corporation, Kyoto (JP)

(72) Inventor: Masahiko Kuroda, Higashiomi (JP)

(73) Assignee: KYOCERA Corporation, Kyoto (JP)

( * ) Notice: Subject to any disclaimer, the term of this patent is extended or adjusted under 35 U.S.C. 154(b) by 282 days.

(21) Appl. No.: 16/468,706

(22) PCT Filed: Dec. 15, 2017

(86) PCT No.: PCT/JP2017/045095
§ 371 (c)(1),
(2) Date: Jun. 12, 2019

(87) PCT Pub. No.: WO2018/110697
PCT Pub. Date: Jun. 21, 2018

(65) Prior Publication Data
US 2019/0358718 A1 Nov. 28, 2019

(30) Foreign Application Priority Data

Dec. 15, 2016 (JP) .............................. JP2016-242875

(51) Int. Cl.
B23C 5/10 (2006.01)
(52) U.S. Cl.
CPC .......... B23C 5/10 (2013.01); B23C 2210/086 (2013.01); B23C 2210/088 (2013.01)
(58) Field of Classification Search
CPC ................ B23C 5/10; B23C 2210/086; B23C 2210/088
See application file for complete search history.

(56) References Cited

U.S. PATENT DOCUMENTS

| 3,117,366 A | 1/1964 | Castor, Sr. | |
| 9,616,505 B2 * | 4/2017 | Haimer | B23C 5/003 |
| 2010/0226726 A1 * | 9/2010 | Strasmann | B23C 5/10 |
| | | | 407/54 |
| 2011/0033251 A1 * | 2/2011 | Davis | B23C 5/10 |
| | | | 407/114 |
| 2015/0078841 A1 † | 3/2015 | Haimer | |
| 2016/0089728 A1 * | 3/2016 | Archambault | B23C 5/10 |
| | | | 407/54 |

FOREIGN PATENT DOCUMENTS

| JP | 2002-233910 A | 8/2002 |
| JP | 2002-273612 A | 9/2002 |
| JP | 2005-279884 A | 10/2005 |
| JP | 2012-086279 A | 5/2012 |

* cited by examiner
† cited by third party

Primary Examiner — Alan Snyder
(74) Attorney, Agent, or Firm — Volpe Koenig (57) ABSTRACT A rotary tool of the present aspect has a body and a cutting edge positioned on the outer periphery of the body. The cutting edge has a first section and a second section when viewed on an imaginary plane defined by cutting a rotational trajectory of the rotary tool on a plane including a rotational axis. The first section has a first region and a second region. A first radius of curvature of the first region is greater than a second radius of curvature of the second region in at least one of a plurality of the first sections.

10 Claims, 9 Drawing Sheets

ROTARY TOOL

CROSS-REFERENCE TO RELATED APPLICATIONS

This application is a national stage entry according to 35 U.S.C. 371 of PCT Application No. PCT/JP2017/045095 filed on Dec. 15, 2017, which claims priority to Japanese Application No. 2016-242875 filed on Dec. 15, 2016, which are entirely incorporated herein by reference.

TECHNICAL FIELD

The present aspect relates to a rotary tool.

BACKGROUND ART

A roughing end mill described in JP 2005-279884 A (Patent Document 1), for example, has been used for cutting workpieces. In the rotary tool described in Patent Document 1, a waveform-shaped cutting edge is positioned on the outer periphery of a cylindrical body portion of the rotary tool.

A wave height and a pitch of the waveform-shaped cutting edge in the rotary tool described in Patent Document 1 are set in accordance with processing conditions, and also, ridge portions each having a convex arc-shape with a constant radius of curvature, and valley portions each having a concave arc-shape with a constant radius of curvature are provided in the waveform-shaped cutting edge.

In general, the pitch is required to be narrowed in order to reduce the cutting resistance. However, when the pitch is narrowed in the rotary tool described in Patent Document 1, adjusting only the radius of curvature of the valley portion may not be sufficient, and it may be necessary to reduce the radius of curvature of the ridge portion. When the radius of curvature of the ridge portion is reduced, there is a risk that stress is concentrated at the apex of the ridge portion during the cut processing and the cutting edge may be damaged.

SUMMARY OF INVENTION

A rotary tool of the a non-limiting aspect includes a cylindrical body including a rotational axis and extending from a first end to a second end, a cutting edge positioned on an outer periphery of the body so as to form a spiral shape from a side of the first end toward a side of the second end, and a discharge groove positioned along the cutting edge. The cutting edge includes a plurality of convex curved first sections and concave curved second sections positioned continuously on the side of the second end with respect to the first sections, respectively, when viewed on an imaginary plane defined by cutting a rotational trajectory of the rotary tool on a plane including the rotational axis. Each of the first sections includes a convex curved first region including an apex in the first section and a concave curved second region positioned between the first region and the second section, and a radius of curvature R11 of the first region is greater than a radius of curvature R12 of the second region in at least one of the plurality of first sections.

DESCRIPTION OF EMBODIMENT

A rotary tool 1 according to various non-limiting embodiments will be described below in detail with reference to the drawings. However, for convenience of explanation, each of the drawings referenced below may be simplified to illustrate only main members among constituent members of the various non-limiting embodiments. Accordingly, the rotary tool 1 may be provided with any constituent member that is not illustrated in each of the drawings referenced in this specification. Further, the dimensions of the members in each of the drawings do not faithfully represent the actual dimensions of the constituent members and the dimension ratios of each of the members.

In the various non-limiting embodiments, a roughing end mill may be illustrated as an example of the rotary tool 1. Note that the rotary tool 1 is not limited to the roughing end mill illustrated in the various non-limiting embodiments, and may be a milling tool, for example.

Figure 1:
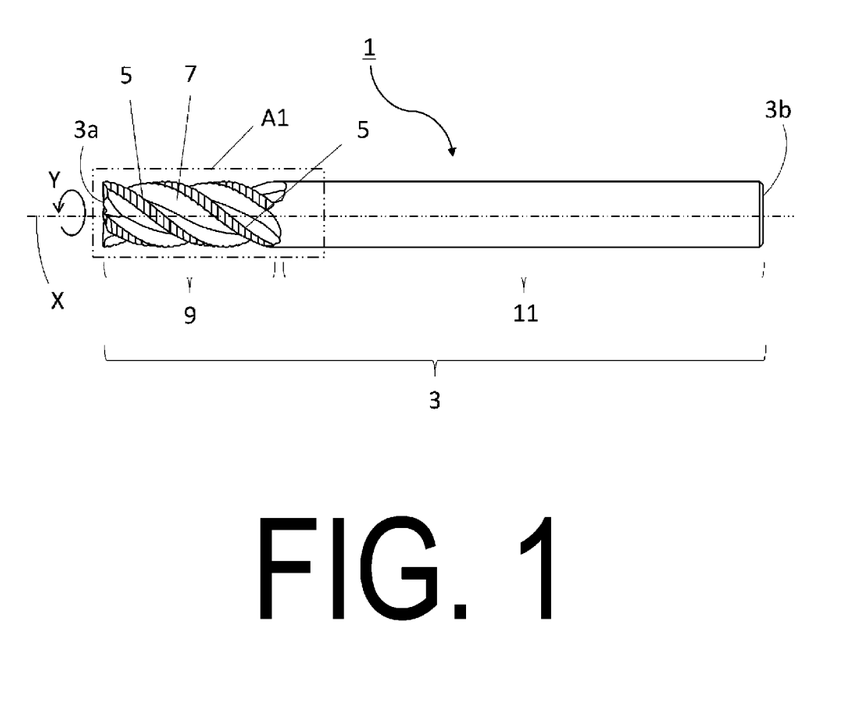
FIG. 1 is a side view illustrating a rotary tool according to an example of a non-limiting embodiment.

The rotary tool 1 of an example illustrated in FIG. 1 may be provided with a cylindrical body 3 that has a rotational axis X and extends from a first end 3a to a second end 3b, cutting edges 5 that are each positioned on the outer periphery of the body 3 so as to form a spiral shape from a side of the first end 3a toward a side of the second end 3b, and discharge grooves 7 positioned along the cutting edges 5. Note that an arrow Y in FIG. 1 and the like may indicate a rotational direction of the body 3 that rotates around the rotational axis X.

The cylindrical body 3 may rotate around the rotational axis X in the direction of the arrow Y when machining a workpiece used for manufacturing a machined product. Note that the body 3 need not necessarily have a cylindrical shape in a strict sense. Further, the outer diameter of the body 3 need not necessarily be constant from the first end 3a to the second end 3b, and the body 3 may have a tapered shape in which the outer diameter of the body 3 increases from the first end 3a toward the second end 3b, for example. In FIG. 1, a left-side end of the body 3 may be the first end 3a and a right-side end of the body 3 may be the second end 3b. Hereinafter, the first end 3a will be referred to as a tip end 3a and the second end 3b will be referred to as a rear end 3b to reflect the usage condition of the rotary tool 1 during the cut processing.

The outer diameter of the body 3 may be set to 4 mm to 25 mm, for example. In addition, when the length of the body 3 in a direction along the rotational axis X is L and the outer diameter of the body 3 is D, the length and the outer diameter may be set to satisfy L=4D to 15D, for example.

The body 3 of the example illustrated in FIG. 1 may have a cutting portion 9 and a shank portion 11. The shank portion 11 may be a portion that is gripped by a rotating spindle of a machine tool (not illustrated) and is designed in accordance with the shape of the spindle in the machine tool. Examples of the shape of the shank portion 11 may include a straight shank, a long shank, a long neck, a tapered shank, and the like.

The cutting portion 9 in the example illustrated in FIG. 1 may be positioned on a side of the tip end 3a with respect to the shank portion 11. The cutting portion 9 may have a section that comes into contact with the workpiece, and this section may play a key role in cut processing the workpiece.

Figure 2:
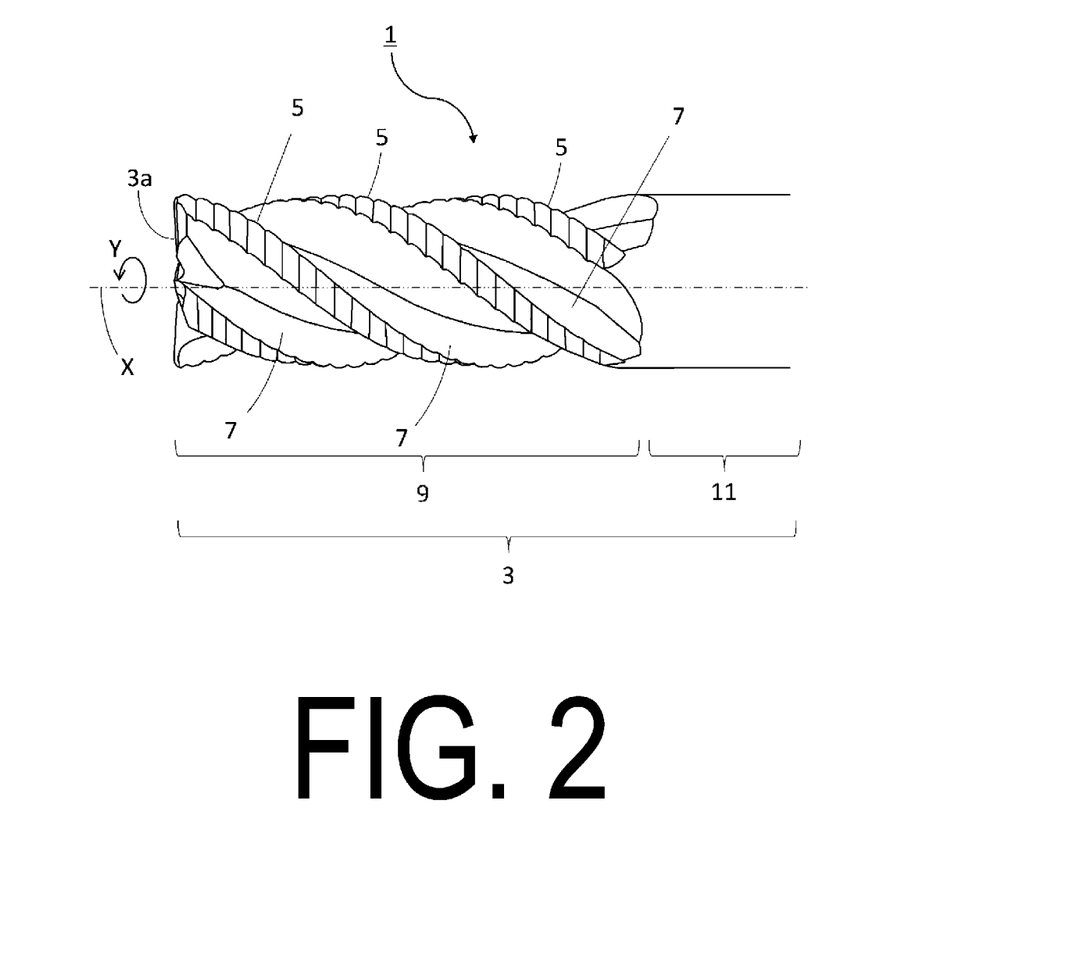
FIG. 2 is an enlarged view of a region A1 in FIG. 1.

On the outer periphery of the cutting portion 9 in the example illustrated in FIG. 2, the cutting edges 5 may be positioned so as to form the spiral shape from the side of the tip end 3a toward a side of the rear end 3b. The cutting edges 5 positioned on the outer periphery of the cutting portion 9 may be commonly referred to as outer peripheral cutting edges. Therefore, in the following description, the cutting edges 5 at the above-described positions will be described as outer peripheral cutting edges 5.

The outer peripheral cutting edge 5 according to an aspect may have a waveform shape as illustrated in FIG. 2, which is an enlarged view of FIG. 1. Note that the "waveform shape" may mean a shape in which ridges and valleys are repeatedly formed. In other words, the "waveform shape" may be a shape in which portions of which distance from the rotational axis X is relatively long and portions of which distance from the rotational axis X is relatively short alternately appear. The number of outer peripheral cutting edges 5 may be one or more than one. The number of outer peripheral cutting edges 5 in the example illustrated in FIG. 2 is four.

The helix angle of the spirally-shaped outer peripheral cutting edge 5 is not limited to a specific value, and may be set to approximately 3 to 45 degrees, for example. The helix angle of the outer peripheral cutting edge 5 can be evaluated by an angle formed by the outer peripheral cutting edge 5 and the rotational axis X when the body 3 is viewed in a side view. In addition, the helix angle of the outer peripheral cutting edge 5 may be constant from the side of the tip end 3a to the side of the rear end 3b, or may change partway.

The discharge grooves 7 may be positioned along the spirally-shaped outer peripheral cutting edges 5 on the outer periphery of the cutting portion 9 in the example illustrated in FIG. 2. The discharge grooves 7 can be used to discharge chips generated by the outer peripheral cutting edges 5 to the outside. Thus, the discharge groove 7 may be positioned in a spiral shape along the outer peripheral cutting edge 5 on a front side in the rotational direction Y with respect to the outer peripheral cutting edge 5. In the example illustrated in FIG. 2, since the number of outer peripheral cutting edges 5 is four, the number of discharge grooves 7 may be also four. The shape of the discharge groove 7 in a cross section orthogonal to the rotational axis X may be a concave curved shape, a rectangular shape, a V-shape, or the like, for example.

The rotary tool 1 according to the various non-limiting embodiments may have one of the characteristics relating to the shape of the outer peripheral cutting edge 5, when viewed on an imaginary plane defined by cutting, on a plane including the rotational axis X, a rotational trajectory of the rotary tool 1 around the rotational axis X.

Figure 3:
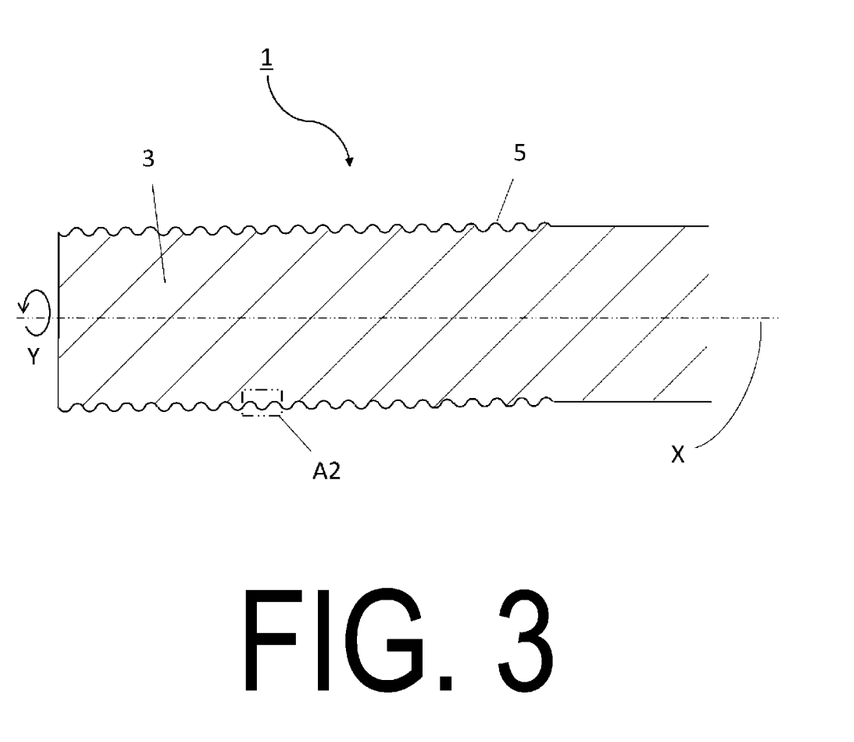
FIG. 3 is an imaginary plane formed by cutting a rotational trajectory of the rotary tool illustrated in FIG. 2 on a plane including a rotational axis.
Figure 4:
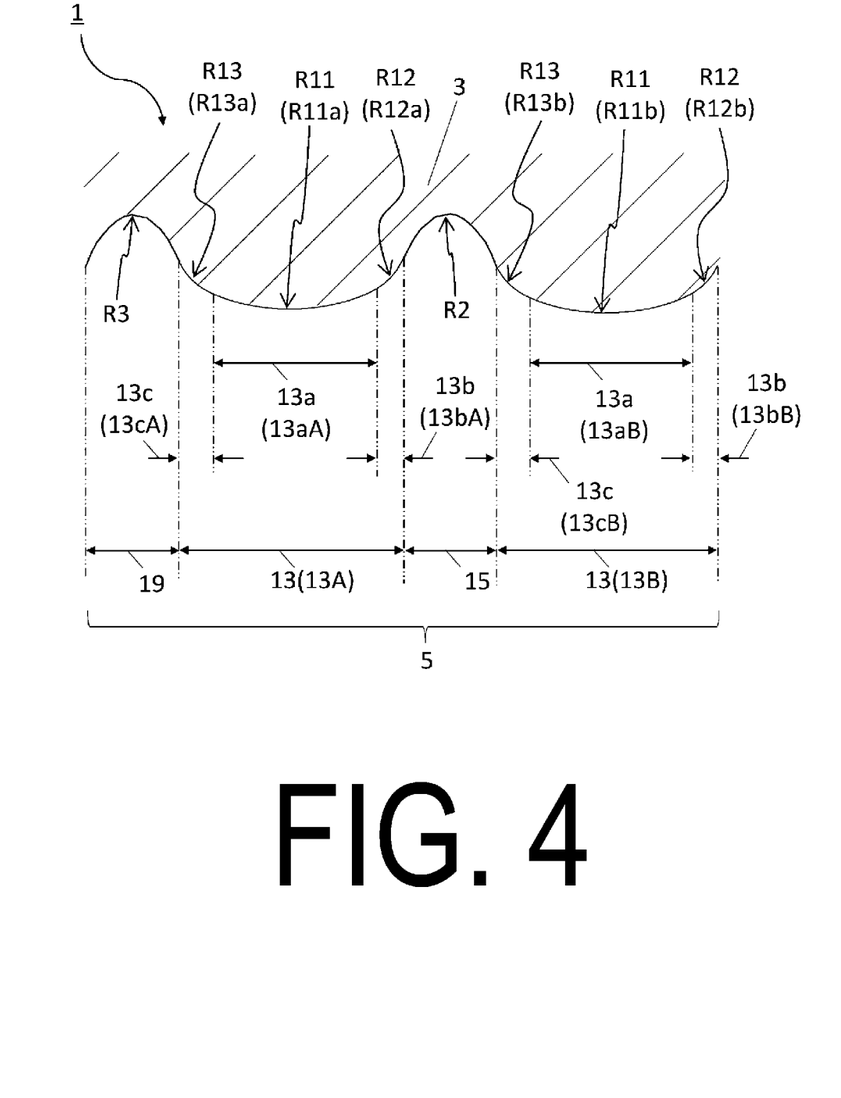
FIG. 4 is an enlarged view of a region A2 in FIG. 3.

The shape of the outer peripheral cutting edge 5 will be described below with reference to FIG. 3 and FIG. 4. FIG. 4 may be an enlarged view of a part of FIG. 3. When viewed on the imaginary plane defined by cutting, on the plane including the rotational axis X, the rotational trajectory of the rotary tool 1, the outer peripheral cutting edge 5 may have a plurality of convex curved first sections 13 and concave curved second sections 15 that are positioned contiguously on the side of the rear end 3b with respect to the plurality of first sections 13, respectively. Further, each of the first sections 13 may have a convex curved first region 13a including an apex of the first section 13, and a convex curved second region 13b that is positioned between the first region 13a and the second section 15.

Then, at least one of the plurality of first sections 13 may be configured such that a radius of curvature R11 of the first region 13a may be greater than a radius of curvature R12 of the second region 13b. Of the plurality of first sections 13, a portion that satisfies R11>R12 may be referred to as a portion A. Note that in FIG. 4, the side of the rear end 3b with respect to the first section 13 may be the right side of the first section 13.

In the rotary tool 1 according to the aspect, the first region 13a, the second region 13b, and the second section 15 may be arranged side by side in this order from the side of the tip end 3a toward the side of the rear end 3b (from the left side to the right side in FIG. 4). The workpiece can be cut mainly by the convex curved first sections 13 protruding toward the outer peripheral side. Further, the outer peripheral cutting edge 5 may have the concave curved second sections 15 that are recessed toward the center of the body 3. When cutting the workpiece, a part of the concave curved second sections 15 can be positioned away from the workpiece. More specifically, since a section that partially does not cut the workpiece may be provided in the second sections 15, the cutting load may be relieved from this section.

Further, each of the first sections 13 according to the present aspect may have the above-described first region 13a, and the radius of curvature in the region including the apex in the first section 13 may be relatively large. Thus, the outer peripheral cutting edge 5 may have an excellent fracture resistance.

In addition, when each of the first sections 13 has the second region 13b, of which the radius of curvature is relatively small, between the first region 13a and the second section 15, the width of the first section 13 in the direction along the rotational axis X may be narrower than a case in which the radius of curvature of the second region 13b is greater than or equal to the radius of curvature of the first region 13a. Thus, a pitch of the outer peripheral cutting edge 5 may be narrower compared to that in a configuration in which the first section 13 has only the first region 13a, and therefore, the cutting resistance may decrease. When the rotary tool 1 has the above-described configuration, since the cutting resistance is low, the effect of chatter vibrations or the like may be reduced, for example.

Note that in the present aspect, the apex in the first section 13 may refer to a portion of the convex curved first section 13 that is positioned furthest away from the rotational axis X.

The outer peripheral cutting edge 5 may be configured by including only the plurality of first sections 13 and the second sections 15 adjacent to the first sections 13, but is not limited to such a shape. For example, the outer peripheral cutting edge 5 may further have a linear or curved section, between the first section 13 and the second section 15, which connects the first section 13 and the second section 15. Note that when the outer peripheral cutting edge 5 has the section connecting the first section 13 and the second section 15, this section may be shorter than the lengths of the first section 13 and the second section 15. For example, the length of the connecting section may be approximately 10% or less relative to the length of each of the first section 13 and second section 15.

Further, when the portion A satisfying R11>R12 is positioned on the side of the tip end 3a with respect to the entire outer peripheral cutting edge 5, the chatter vibrations may be effectively suppressed. In a configuration in which the shank portion 11 is gripped by a spindle, the chatter vibrations may tend to become stronger as it is closer to the tip end 3a. However, when the portion A is positioned on the side of the tip end 3a, the chatter vibrations may be effectively suppressed because the cutting resistance in the portion A is low.

Further, the first section 13 may have only the first region 13a and the second region 13b, and may have a shape in which the second region 13b is adjacent to the first region 13a, but the first section 13 is not limited to such a shape. For example, the first section 13 may further have a linear or curved region, between the first region 13a and the second region 13b, which connects the first region 13a and the second region 13b. Note that when the first section 13 has the region connecting the first region 13a and the second region 13b, this region may be shorter than the lengths of the first region 13a and the second region 13b. For example, the length of the connecting region may be approximately 10% or less relative to the length of each of the first region 13a and the second region 13b.

The radius of curvature R11 and the radius of curvature R12 may be set such that R11 is in a range from 0.5 to 2.5 mm and R12 is in a range from 0.2 to 0.7 mm, for example.

The radius of curvature R11 may be set to be approximately 8 to 13% relative to the outer diameter D, for example. In addition, the radius of curvature R12 may be set to be approximately 3 to 6% relative to the outer diameter D, for example. For example, when the outer diameter D of the body 3 is 10 mm, the radius of curvature R11 may be set to be 0.8 to 1.3 mm, and the radius of curvature R12 may be set to be 0.3 to 0.6 mm.

On the imaginary plane, the plurality of first sections 13 may have a first section 13A that is one of the two adjacent first sections 13, and a first section 13B positioned on the side of the rear end 3b with respect to the first section 13A. Here, the first section 13A and the first section 13B may be considered as one set. In at least one of the sets, each including the first section 13A and the first section 13B, a radius of curvature R11a of the first region 13a in the first section 13A (hereinafter, referred to as a first region 13aA for the purpose of identification) may be different from a radius of curvature R11b of the first region 13a in the first section 13B (hereinafter, referred to as a first region 13aB for the purpose of identification). Hereinafter, a portion in which R11a and R11b are different will be referred to as a portion B. When R11a and R11b are different in the first region 13aA and the first region 13aB, vibration modes in the portion B may be different from each other during the cut processing, and the vibrations from each of the regions may be partially offset, thus suppressing the chatter vibrations.

In addition, the radius of curvature R11a may be greater than the radius of curvature R11b. Hereinafter, a portion in which the outer peripheral cutting edge 5 satisfies R11a>R11b will be referred to as a section C. When the outer peripheral cutting edge 5 has the portion C, stress concentration may be alleviated due to the relatively large radius of curvature R11a of the first region 13aA positioned on the side of the tip end 3a. As a result, the chatter vibrations may be easily suppressed.

Further, the radius of curvature of the first region 13a positioned adjacent to the first region 13aB on the side of the rear end 3b (hereinafter, referred to as a first region 13aC for the purpose of identification) may be referred to as R11c, and when R11a, R11b, and R11c are different from each other, the vibrations from each of the regions may be more easily offset, thus further suppressing the chatter vibrations.

Here, the three radii of curvature R11a, R11b, and R11c may satisfy R11a>R11b>R11c. In this way, among the three first regions 13a positioned adjacent to each other, when the closer the first region 13a is toward the side of the tip end 3a, the radius of curvature may be larger, the chatter vibrations may be even further suppressed.

In addition, in at least one of the sets including the first section 13A and the first section 13B, a radius of curvature R12a of the second region 13b in the first section 13A (hereinafter, referred to as a second region 13bA for the purpose of identification) may be different from a radius of curvature R12b of the second region 13b in the first section 13B (hereinafter, referred to as a second region 13bB for the purpose of identification). Hereinafter, a portion in which R12a and R12b are different will be referred to as a portion D. In this way, when the radii of curvature of the second region 13b A and the second region 13bB are different, the vibration modes in the portion D may be different from each other during the cut processing, and the vibrations from each of the regions may be partially offset, thus suppressing the chatter vibrations.

Also, the radius of curvature R12a may be greater than the radius of curvature R12b. Hereinafter, a portion in which the outer peripheral cutting edge 5 satisfies R12a>R12b will be referred to as a portion E. When the outer peripheral cutting edge 5 has the portion E, the stress concentration may be alleviated due to the relatively large radius of curvature R12a of the second region 13bA positioned on the side of the tip end 3a. As a result, the chatter vibrations may be easily suppressed.

Further, the radius of curvature of the second region 13b positioned adjacent to the second region 13bB on the side of the rear end 3b (hereinafter, referred to as a second region 13bC for the purpose of identification) may be referred to as R12c, and when R12a, R12b, and R12c are different from each other, the vibrations from each of the regions may be more easily offset, thus further suppressing the chatter vibrations.

Here, the three radii of curvature R12a, R12b, and R12c may satisfy R12a >R12b >R12c. In this way, among the three second regions 13b positioned adjacent to each other, when the closer the second region 13b is toward the tip end 3a, the radius of curvature may be larger, the chatter vibrations may be even further suppressed.

In addition, on the imaginary plane, the outer peripheral cutting edge 5 may have a portion in which the radius of curvature R12 is greater than a radius of curvature R2 of the second sections 15. In such a case, since the pitch of the outer peripheral cutting edge 5 is narrow, the cutting resistance may be further reduced.

On the imaginary plane, in addition to the first sections 13 and the second sections 15, the outer peripheral cutting edge 5 may further have concave curved third sections 19 positioned continuously on the side of the tip end 3a, namely, on the left side in FIG. 4, with respect to the plurality of first sections 13, respectively. Further, each of the first sections 13 may have a convex curved third region 13c that is positioned between the convex curved first region 13a including the apex in the first section 13 and the third section 19. Further, the radius of curvature R11 of the first region 13*a* may be greater than a radius of curvature R13 of the third region 13*c* in at least one of the plurality of first sections 13.

In the above-described case, the third section 19, the third region 13*c*, and the first region 13*a* may be arranged side by side in this order from the side of the tip end 3*a* toward the side of the rear end 3*b*. When the outer peripheral cutting edge 5 has the concave curved third sections 19 that are recessed toward the center of the body 3, since the section that partially does not cut the workpiece is provided in the third section 19 in the same manner as in the second section 15, the cutting load may be relieved from this section. When the outer peripheral cutting edge 5 has the third sections 19 in addition to the first sections 13 and second sections 15, the number of sections that partially do not cut the workpiece increases. Thus, the cutting load becomes even smaller. Also, the pitch becomes even narrower.

Further, when the first section 13 has the third region 13*c*, of which the radius of curvature is relatively small, between the first region 13*a* and the third section 19, the width of the first section 13 in the direction along the rotational axis X becomes narrower compared to when the radius of curvature of the third region 13*c* is greater than or equal to the radius of curvature of the first region 13*a*. Thus, a pitch of the outer peripheral cutting edge 5 may be narrower compared to that in a configuration in which the first section 13 has only the first region 13*a*, and therefore the cutting resistance decreases. When the rotary tool 1 has the above-described configuration, the cutting resistance may be low. Thus, the effect of the chatter vibrations or the like may be reduced, for example.

The outer peripheral cutting edge 5 may have only the first sections 13, the second sections 15, and the third sections 19 and may be shaped such that the third sections 19 are adjacent to the first sections 13, but is not limited to such a shape. For example, the outer peripheral cutting edge 5 may further have a linear or curved section, between the first section 13 and the third section 19, which connects the first section 13 and the third section 19. Note that when the outer peripheral cutting edge 5 has the section connecting the first section 13 and the third section 19, this section may be shorter than the lengths of the first section 13 and the third section 19. For example, the length of the connecting section may be approximately 10% or less relative to the length of each of the first section 13 and the third section 19.

Further, when the first sections 13, the second sections 15, and the third sections 19 that have the relationships of R11>R12 and R11>R13 are positioned on the side of the tip end 3*a* with respect to the entire outer peripheral cutting edge 5, the chatter vibrations may be effectively suppressed.

In addition, the first section 13 may have only the first region 13*a*, the second region 13*b*, and the third region 13*c* and may be shaped such that the third region 13*c* is adjacent to the first region 13*a*, but is not limited to such a shape. For example, the first section 13 may further have a linear or curved region, between the first region 13*a* and the third region 13*c*, which connects the first region 13*a* and the third region 13*c*. Note that when the first section 13 has the region connecting the first region 13*a* and the third region 13*c*, this region may be shorter than the lengths of the first region 13*a* and the third region 13*c*. For example, the length of the connecting region may be approximately 10% or less relative to the length of each of the first region 13*a* and the third region 13*c*.

The radius of curvature R13 may be set in a range from 0.2 to 0.7 mm, for example. The radius of curvature R13 may be set to be approximately 3 to 6% relative to the outer diameter D, for example. For example, when the outer diameter D of the body 3 is 10 mm, the radius of curvature R13 may be set to be 0.3 to 0.6 mm.

On the imaginary plane of an example illustrated in FIG. 4, the plurality of first sections 13 may have the first section 13A that is one of the two adjacent first sections 13, and the first section 13B positioned on the side of the rear end 3*b* with respect to the first section 13A. Here, the first section 13A and the first section 13B may be considered to be one set. In at least one of the sets, each including the first section 13A and the first section 13B, a radius of curvature R13*a* of the third region 13*c* in the first section 13A (hereinafter, referred to as a third region 13*c*A for the purpose of identification) may be different from a radius of curvature R13*b* of the third region 13*c* in the first section 13B (hereinafter, referred to as a third region 13*c*B for the purpose of identification). Hereinafter, a portion in which R13*a* and R13*b* are different will be referred to as a portion F. When R13*a* and R13*b* are different in the third region 13*c*A and the third region 13*c*B that are positioned adjacent to each other, the vibration modes in the portion F may be different from each other during the cut processing, and the vibrations from each of the regions may be partially offset, thus suppressing the chatter vibrations.

Further, the radius of curvature R13*a* may be greater than the radius of curvature R13*b*. Hereinafter, a portion of the outer peripheral cutting edge 5 that satisfies R13*a*>R13*b* will be referred to as a portion G. When the outer peripheral cutting edge 5 has the portion G, the stress concentration may be alleviated due to the relatively large radius of curvature R13*a* of the third region 13*c*A positioned on the side of the tip end 3*a*. As a result, the chatter vibrations may be easily suppressed.

Further, the radius of curvature of the third region 13*c* positioned adjacent to the third region 13*c* B on the side of the rear end 3*b* (hereinafter, referred to as a third region 13*c*C for the purpose of identification) may be referred to as R13*c*, and when R13*a*, R13*b*, and R13*c* are different from each other, the vibrations from each of the regions may be more easily offset, thus further suppressing the chatter vibrations.

Here, the three radii of curvature R13*a*, R13*b* and R13*c* may satisfy R13*a*>R13*b*>R13*c*. In this way, among the three third regions 13*c* positioned adjacent to each other, when the closer the third region 13*c* is toward the side of the tip end 3*a*, the radius of curvature becomes larger, the chatter vibrations may be even further suppressed.

In addition, on the imaginary plane, the outer peripheral cutting edge 5 may have a portion in which the radius of curvature R13 is greater than a radius of curvature R3 of the third section 19. In such a case, since the pitch of the outer peripheral cutting edge 5 is narrow, the cutting resistance may be further reduced.

On the imaginary plane, the radius of curvature R13 may be greater than the radius of curvature R12 in at least one of the plurality of first sections 13. Hereinafter, a portion of the outer peripheral cutting edge 5 that satisfies R13>R12 will be referred to as a portion H. When the outer peripheral cutting edge 5 has the portion H, since the radius of curvature R13 of the third region 13*c* positioned on the side of the tip end 3*a* is relatively large, the chatter vibrations may be easily suppressed.

R12 and R13 may be the same values. When R12 is equal to R13, it may be easy to prevent the cutting load applied to the first section 13 from being concentrated on a part of the first section 13. Thus, durability of the first section 13 may be further enhanced. Note that R12 and R13 having the same values does not necessarily mean that R12 and R13 are exactly the same values. When R12 is 95 to 105% relative to R13, R12 and R13 may be considered to be the same values.

In the various non-limiting embodiments, the outer peripheral cutting edges 5 may be waveform-shaped and each may have a configuration in which a plurality of convex-shaped portions and a plurality of concave-shaped portions are alternately positioned therein. In the various non-limiting embodiments, the plurality of convex-shaped portions may correspond to the first sections 13, and the plurality of concave-shaped portions may correspond to the second sections 15 or the third sections 19.

Here, when one of the first sections 13 is used as a reference, the concave-shaped portion positioned on the side of the tip end 3a may be the third section 19, and the concave-shaped portion positioned on the side of the rear end 3b may be the second section 15. However, when the reference first section 13 is changed to the first section 13 positioned adjacent to the initial reference first section 13 on the side of the rear end 3b, the second section 15 in relation to the initial reference first section 13 may become the third section 19 in relation to the new reference first section 13.

In the various non-limiting embodiments, when the waveform-shape of the outer peripheral cutting edge 5 is generally formed in the same shape, the outer peripheral cutting edge 5 may have a low cutting resistance, and as a whole, may have an excellent fracture resistance.

When the rotary tool 1 has the plurality of outer peripheral cutting edges 5, as in the various non-limiting embodiments, when the rotational trajectory of each of the outer peripheral cutting edges 5 is viewed on the imaginary plane, the smoothness of a machined surface of the workpiece may be improved when the rotational trajectories of the outer peripheral cutting edges 5 are not overlapping with each other. This may be because a section of the workpiece that has not yet been cut by one of the plurality of outer peripheral cutting edges 5 can be cut by the other outer peripheral cutting edges 5.

For example, when the outer peripheral cutting edges 5 are two outer peripheral cutting edges 5a and 5b, if the rotational trajectory of the outer peripheral cutting edge 5a and the rotational trajectory of the outer peripheral cutting edge 5b do not overlap with each other, a section of the workpiece that has not yet been cut by the outer peripheral cutting edge 5a can be cut by the outer peripheral cutting edge 5b. Thus, the smoothness of the machined surface of the workpiece may be improved.

Here, when the apexes of a pair of the first sections 13 positioned adjacent to each other on the rotational trajectory of the outer peripheral cutting edge 5b are positioned at the centers between the apexes of a pair of the first sections 13 positioned adjacent to each other on the rotational trajectory of the outer peripheral cutting edge 5a, the section of the workpiece that has not been cut by the outer peripheral cutting edge 5a can be efficiently cut by the outer peripheral cutting edge 5b.

Figure 5:
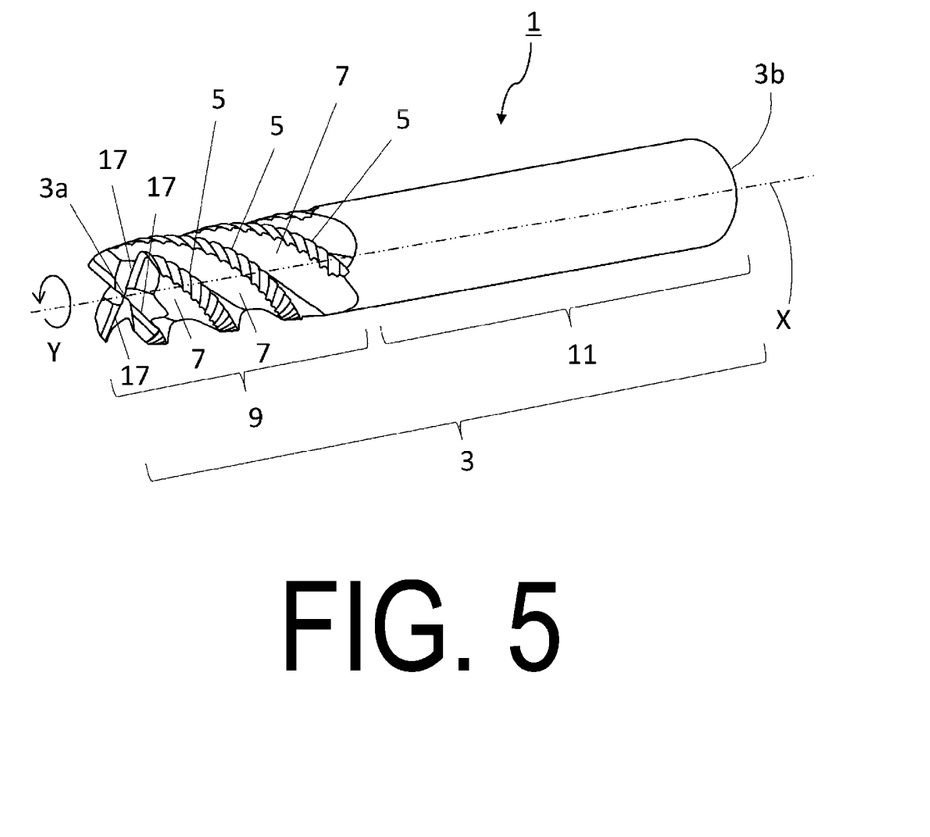
FIG. 5 is a perspective view of the rotary tool illustrated in FIG. 1.
Figure 6:
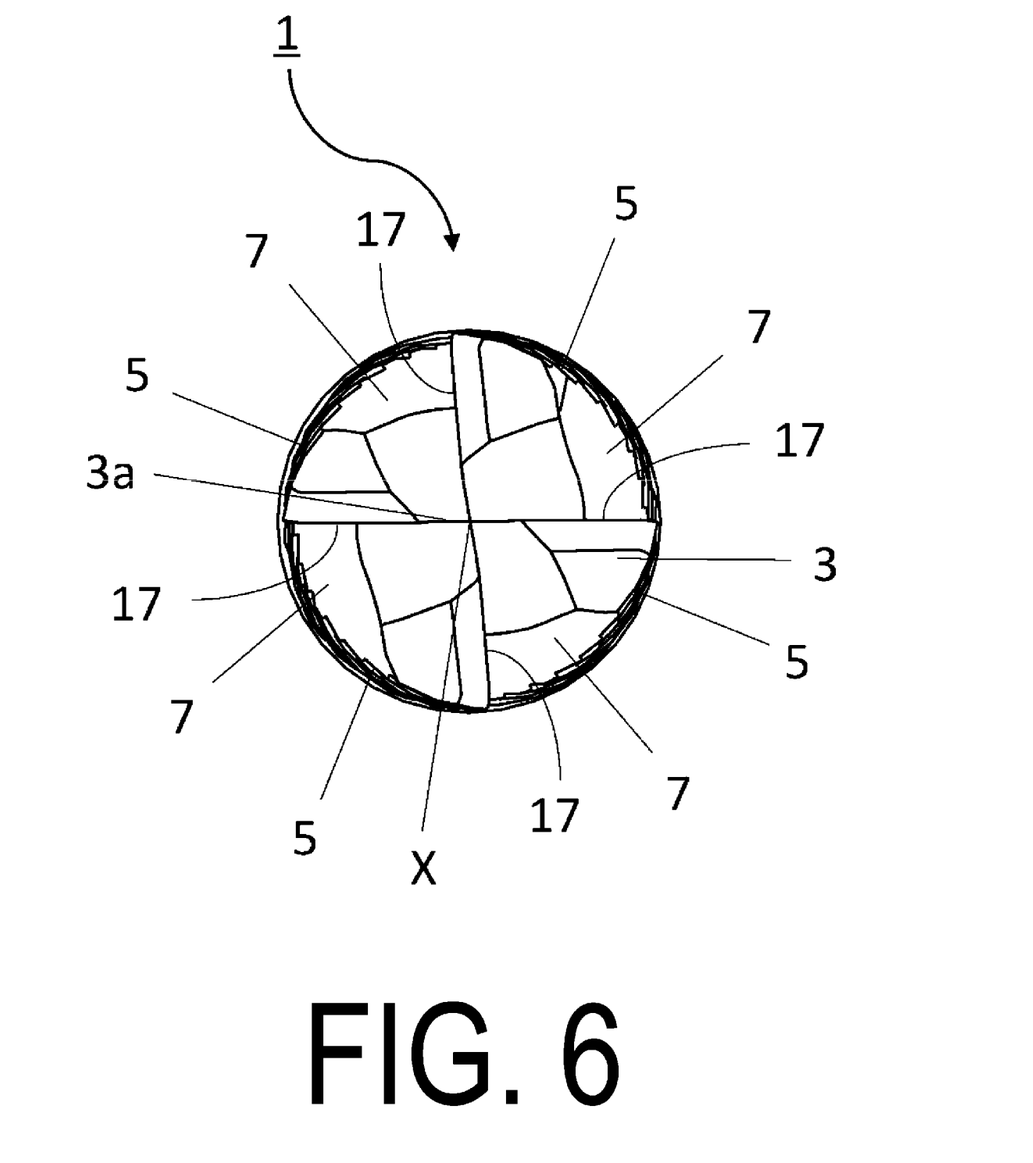
FIG. 6 is a front view of a first end of the rotary tool illustrated in FIG. 1.

As illustrated in FIG. 5 and FIG. 6, the rotary tool 1 may have tip cutting edges 17 positioned at the tip end 3a of the body 3 in addition to the outer peripheral cutting edges 5. When the rotary tool 1 has the tip cutting edges 17, the cut processing may be performed while moving the rotary tool 1 in the direction along the rotational axis X as well as in a direction orthogonal to the rotational axis X. Examples of the tip cutting edge 17 may have a square end blade with a center hole, a center cut square end blade, a ball end blade, a radius end blade, and the like.

Examples of the material of the body 3 may include cemented carbide alloy, cermet, or the like. Examples of the composition of the cemented carbide alloy may include WC—Co, WC—TiC—Co, and WC—TiC—TaC—Co. Here, WC, TiC, and TaC may be hard particles, and Co may be a binder phase. Also, cermet may be a sintered composite material obtained by combining a metal with a ceramic component. Specifically, examples of the cermet may include titanium compounds in which titanium carbide (TiC) or titanium nitride (TiN) may be the main component.

The surface of the body 3 may be coated with a coating film using a chemical vapor deposition (CVD) method or a physical vapor deposition (PVD) method. Examples of the composition of the coating film may include titanium carbide (TiC), titanium nitride (TiN), titanium carbonitride (TiCN), alumina ($Al_2O_3$), or the like.

Method for Manufacturing Machined Product

Next, a method for manufacturing a machined product according to the various non-limiting embodiments will be described in detail with reference to a case in which the rotary tool 1 according to the aspect illustrated in FIG. 1 may be used as an example. Below, a description will be made with reference to FIG. 7 to FIG. 9.

The manufacturing method has:

(1) rotating the rotary tool 1 exemplified by the above-described embodiment around the rotational axis X;

(2) bringing blades (the outer peripheral cutting edges) of the rotary tool 1 that is rotating into contact with a workpiece 21, and (3) separating the rotary tool 1 from the workpiece 21.

Figure 7:
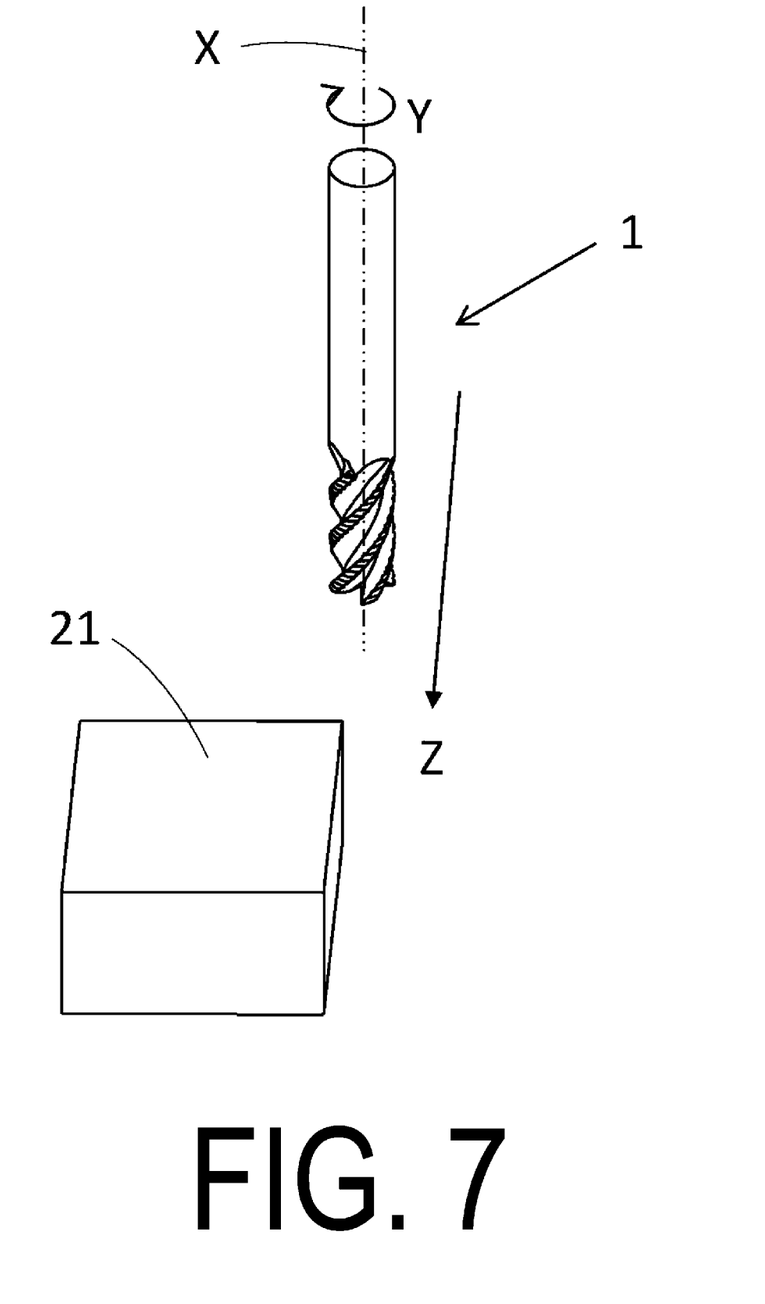
FIG. 7 is a diagram illustrating a step of a method for manufacturing a machined product according to an example of a non-limiting embodiment.
Figure 8:
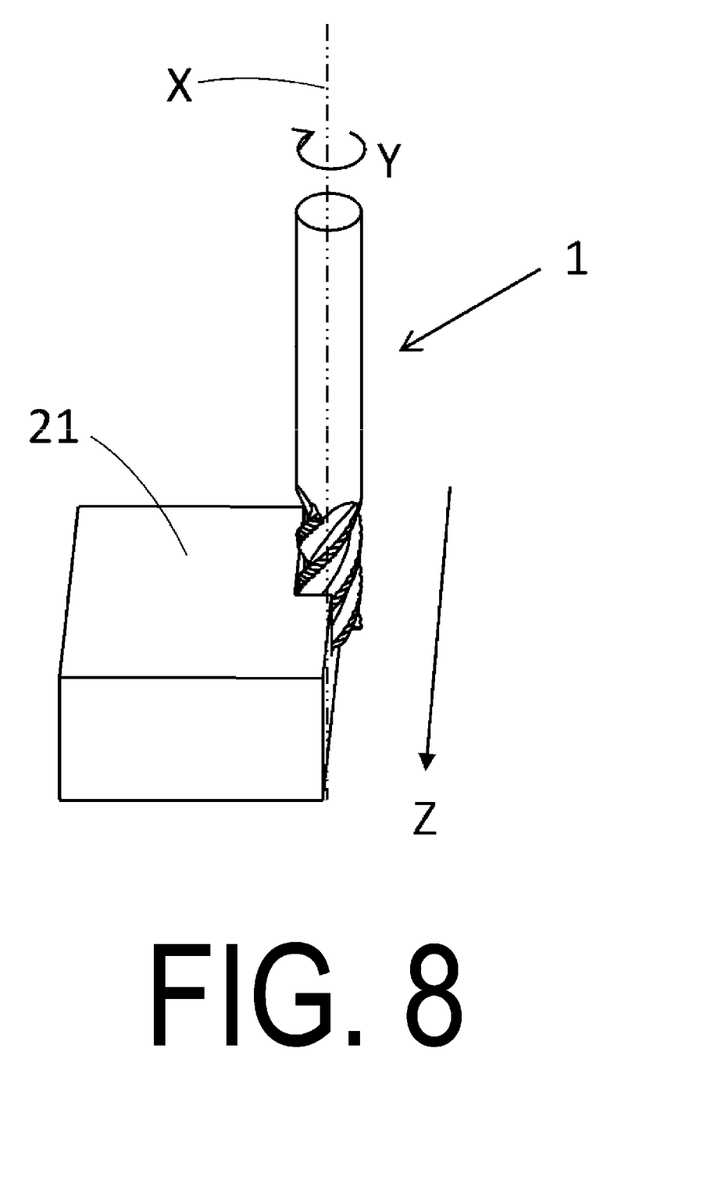
FIG. 8 is a diagram illustrating a step of the method for manufacturing the machined product according to an example of a non-limiting embodiment.
Figure 9:
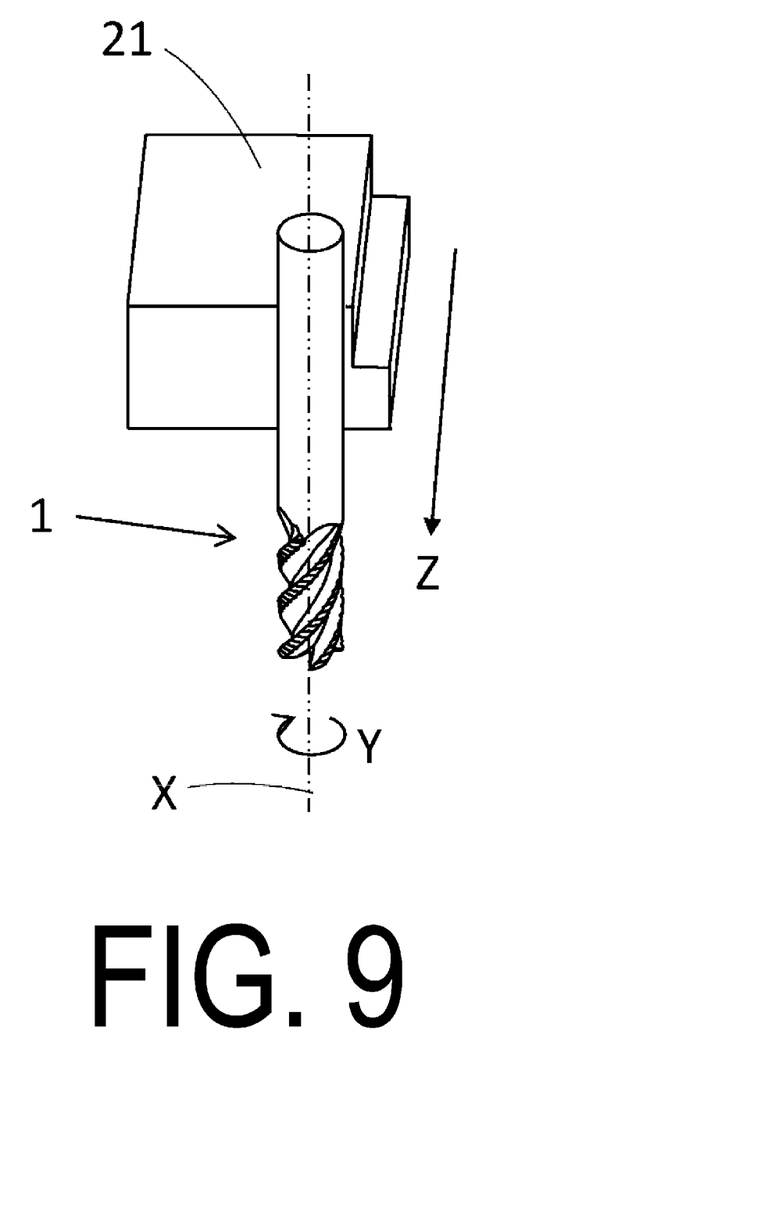
FIG. 9 is a diagram illustrating a step of the method for manufacturing the machined product according to an example of a non-limiting embodiment.

More specifically, firstly, as illustrated in FIG. 7, by rotating the rotary tool 1 around the rotational axis X while moving the rotary tool 1 in a Z direction orthogonal to the rotational axis X, the rotary tool 1 may be brought relatively close to the workpiece 21. Next, as illustrated in FIG. 8, the outer peripheral cutting edges of the rotary tool 1 may be brought into contact with the workpiece 21 and cut the workpiece 21. Then, as illustrated in FIG. 9, by moving the rotary tool 1 further in the Z direction, the rotary tool 1 may be relatively moved away from the workpiece 21.

In the present aspect, the rotary tool 1 may be brought close to the workpiece 21 in a state in which the workpiece 21 is fixed and the rotary tool 1 rotating around the rotational axis X. In addition, in FIG. 8, the workpiece 21 may be cut as a result of the outer peripheral cutting edges of the rotary tool 1 that is rotating being brought into contact with the workpiece 21. Further, in FIG. 9, the rotary tool 1 in the rotating state may be moved away from the workpiece 21.

Note that in the cut processing of the manufacturing method according to the non-limiting aspect, in each of the steps, the rotary tool 1 may be brought into contact with or separated from the workpiece 21 by moving the rotary tool 1. However, as a matter of course, the cut processing is not limited to such a mode.

For example, in step (1), the workpiece 21 may be brought close to the rotary tool 1. In the same manner, in step (3), the workpiece 21 may be moved away from the rotary tool 1. When the cut processing is to be continued, a step of bringing the outer peripheral cutting edges into contact with a different position on the workpiece 21 may be repeated while maintaining the rotating state of the rotary tool 1.

Note that in FIG. 8, the rotary tool 1 may be moved along the Z direction, but the present disclosure is not limited to this aspect. For example, when the cutting edge has the tip cutting edge, the cut processing may be performed while moving the rotary tool 1 in the direction along the rotational axis X.

Representative examples of the material of the workpiece 21 may have aluminum, carbon steel, alloy steel, stainless steel, cast iron, non-ferrous metals, or the like.

REFERENCE SIGNS LIST

1 Rotary tool
3 Body
3a First end (tip end)
3b Second end (rear end)
5 Cutting edge (outer peripheral cutting edge)
7 Discharge groove
9 Cutting portion
11 Shank portion
13 First section
13A First section A
13B First section B
13a First region
13b Second region
13c Third region
15 Second section
17 Tip cutting edge
19 Third section
21 Workpiece
X Rotational axis
Y Rotational direction
Z Cutting direction
R11 Radius of curvature of first region
R12 Radius of curvature of second region
R13 Radius of curvature of third region
R2 Radius of curvature of second section
R3 Radius of curvature of third section

The invention claimed is:

1. A rotary tool comprising:
a cylindrical body including a rotational axis and extending from a first end to a second end;
a cutting edge positioned on an outer periphery of the body to form a spiral shape from a side of the first end toward a side of the second end; and
a discharge groove positioned along the cutting edge, wherein,
in a cross section of a rotational trajectory of the rotary tool including the rotational axis,
the cutting edge comprises
a plurality of convex sections each having a convex curved shape, and
a plurality of first concave sections each having a concave curved shape and positioned contiguously on the side of the second end with respect to the convex sections, respectively, each of the convex sections comprises
a first region having a convex curved shape and including an apex in the convex section and
a second region having a convex curved shape and positioned between the first region and the first concave section,
a first radius of curvature of the first region is greater than a second radius of curvature of the second region in at least one of the plurality of convex sections, and in the cross section, the second radius of curvature is greater than a radius of curvature of the first concave sections in at least one of the plurality of convex sections.

2. The rotary tool according to claim 1, wherein
in the cross section, the plurality of convex sections comprises a first section and a second section positioned adjacent to the first section on the side of the second end and
the first radius of curvature in the first section is different from the first radius of curvature in the second section.

3. The rotary tool according to claim 2, wherein the first radius of curvature in the first section is greater than the first radius of curvature in the second section.

4. The rotary tool according to claim 1, wherein
in the cross section, the plurality of convex sections comprises a first section and a second section positioned adjacent to the first section on the side of the second end, and
the second radius of curvature in the first section is different from a second radius of curvature in the second section.

5. The rotary tool according to claim 4, wherein
the second radius of curvature in the first section is greater than the second radius of curvature in the second section.

6. The rotary tool according to claim 1, wherein
in the cross section, the cutting edge further comprises a plurality of second concave sections each having a concave curved shape and positioned contiguously on the side of the first end with respect to the plurality of convex sections, respectively,
each of the convex sections further comprises a third region having a convex curved shape and positioned between the first region and the second concave section, and
the first radius of curvature is greater than a third radius of curvature of the third region in at least one of the plurality of convex sections.

7. The rotary tool according to claim 6, wherein
in the cross section, the plurality of convex sections comprises a first section and a second section positioned adjacent to the first section on the side of the second end, and
the third radius of curvature in the first section is different from the third radius of curvature in the second section.

8. The rotary tool according to claim 7, wherein
the third radius of curvature in the first section is greater than the third radius of curvature in the second section.

9. The rotary tool according to claim 6, wherein
in the cross section, the third radius of curvature is greater than a radius of curvature of the second concave section in at least one of the plurality of convex sections.

10. The rotary tool according to claim 6, wherein
in the cross section, the third radius of curvature is greater than the second radius of curvature in at least one of the plurality of convex sections.

* * * * *